United States Patent
Huang et al.

(10) Patent No.: US 10,395,359 B2
(45) Date of Patent: *Aug. 27, 2019

(54) ADAPTIVE LOCAL THRESHOLD AND COLOR FILTERING

(71) Applicant: KLA-Tencor Corporation, Milpitas, CA (US)

(72) Inventors: Junqing Huang, Fremont, CA (US); Hucheng Lee, Cupertino, CA (US); Kenong Wu, Davis, CA (US); Lisheng Gao, Saratoga, CA (US)

(73) Assignee: KLA-Tencor Corp., Milpitas, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/624,649

(22) Filed: Jun. 15, 2017

(65) Prior Publication Data

US 2017/0287128 A1    Oct. 5, 2017

Related U.S. Application Data

(63) Continuation of application No. 14/450,170, filed on Aug. 1, 2014, now Pat. No. 9,704,234.

(60) Provisional application No. 61/863,535, filed on Aug. 8, 2013.

(51) Int. Cl.
  *G06T 7/00* (2017.01)
  *G06T 7/90* (2017.01)

(52) U.S. Cl.
  CPC .......... *G06T 7/0008* (2013.01); *G06T 7/0006* (2013.01); *G06T 7/90* (2017.01); *G06T 2207/10024* (2013.01); *G06T 2207/20024* (2013.01); *G06T 2207/20076* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 9,704,234 B2* | 7/2017 | Huang | .................. | G06T 7/0006 |
| 2011/0320149 A1* | 12/2011 | Lee | .................... | G01N 21/9501 |
| | | | | 702/83 |
| 2012/0141012 A1* | 6/2012 | Sakai | ................. | G01N 21/9501 |
| | | | | 382/149 |

* cited by examiner

*Primary Examiner* — Bernard Krasnic

(74) *Attorney, Agent, or Firm* — Ann Marie Mewherter

(57) ABSTRACT

Methods and systems for detecting defects on a wafer using adaptive local thresholding and color filtering are provided. One method includes determining local statistics of pixels in output for a wafer generated using an inspection system, determining which of the pixels are outliers based on the local statistics, and comparing the outliers to the pixels surrounding the outliers to identify the outliers that do not belong to a cluster of outliers as defect candidates. The method also includes determining a value for a difference in color between the pixels of the defect candidates and the pixels surrounding the defect candidates. The method further includes identifying the defect candidates that have a value for the difference in color greater than or equal to a predetermined value as nuisance defects and the defect candidates that have a value for the difference in color less than the predetermined value as real defects.

23 Claims, 2 Drawing Sheets

ADAPTIVE LOCAL THRESHOLD AND COLOR FILTERING

BACKGROUND OF THE INVENTION

1. Field of the Invention

This invention generally relates to detecting defects on a wafer using adaptive local thresholding and color filtering.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

Inspection processes generally detect a significant amount of potential defects that are actually nuisance defects on the wafer or noise. Nuisance defects as that term is generally used in the art can be defined as defects that are detected on the wafer that the user does not care about or events that are detected as defects but are not any kind of actual defects. For instance, nuisance defects may be events that are detected as defects but are actually color variations in images of a wafer due to variations in a process performed on the wafer that do not have any effect on the devices being fabricated on the wafer. Therefore, detecting such nuisance defects and reporting them as actual defects to a user have a number of disadvantages such as obscuring actual defects that a user cares about and/or affect the device fabrication in a meaningful manner in the inspection results, obstructing process control attempts to correct the actual defects that a user cares about, and causing users to change the wafer inspection process in ways to reduce the detection of nuisance defects that cause fewer defects of interest to be detected.

Since nuisance defects will be detected by most every inspection process, many inspection processes have been developed in which defect detection is performed and then the detected defects are filtered in some manner to separate defects of interest from nuisance defects. For instance, When there is color variation in images of a wafer that causes nuisance defects to be detected, defect size or energy attributes have been used to try to de-tune the color variation. Size and energy attributes can be calculated after pixels have been flagged as defect candidates. Both work to some extent for nuisance filtering but could not achieve the desired nuisance rate without dropping smaller, more important defects of interest. In addition, the size attribute can be unstable as it can be directly related to the threshold used for defect detection. In particular, for the same defect, if the threshold is higher, the size attribute could be smaller. In addition, energy attributes work to some extent for bigger, more spread out color variation, but substrates of different materials could have strongly concentrated differences. Those strongly concentrated differences usually have the same level of energy attribute reading as defects of interest. Therefore, when defect characteristics such as size and energy attributes are used for post-detection filtering, too many color nuisances may be included in the final inspection results.

Two-dimensional (2D) outlier detection is an efficient way of detecting defects on a wafer and can tolerate some levels of global color variation. However, when color variation is localized to images of some substrates but not others, 2D outlier detection cannot tell the difference between defects and color nuisances. 2D outlier detection can also lose the local spatial content of individual pixels in output generated for a wafer.

Accordingly, it would be advantageous to develop methods and systems for detecting defects on a wafer that can be used to more effectively reduce the nuisance rate of inspection processes for wafers with color variation in images of the wafers produced by the inspection processes.

SUMMARY OF THE INVENTION

The following description of various embodiments is not to be construed in any way as limiting the subject matter of the appended claims.

One embodiment relates to a computer-implemented method for detecting defects on a wafer. The method includes determining local statistics of pixels in output for a wafer generated using an inspection system. The method also includes determining which of the pixels are outliers based on the local statistics. The method further includes comparing the outliers to the pixels surrounding the outliers to identify the outliers that do not belong to a cluster of outliers as defect candidates. In addition, the method includes determining a value for a difference in color between the pixels of the defect candidates and the pixels surrounding the defect candidates. The method also includes identifying the defect candidates that have a value for the difference in the color that is greater than or equal to a predetermined value as nuisance defects and identifying the defect candidates that have a value for the difference in the color that is less than the predetermined value as the real defects. Determining the local statistics, determining which of the pixels are the outliers, comparing the outliers, determining the value for the difference in the color, identifying the defect candidates as the nuisance defects, and identifying the defect candidates as the real defects are performed by a computer system.

Each of the steps of the method described above may be performed as described further herein. The method described above may include any other step(s) of any other method(s) described herein. The method described above may be performed using any of the systems described herein.

Another embodiment relates to a non-transitory computer-readable medium storing program instructions executable on a computer system for performing a computer-implemented method for detecting defects on a wafer. The computer-implemented method includes the steps of the computer-implemented method described above, which may be performed as described further herein. In addition, the computer-implemented method for which the program instructions are executable may include any other step(s) of any other method(s) described herein. The non-transitory computer-readable medium may be further configured as described herein.

An additional embodiment relates to a system configured to detect defects on a wafer. The system includes an optical subsystem configured to direct light to a wafer and detect light from the wafer to thereby generate output for the wafer. The system also includes a computer subsystem configured to perform the steps of the computer-implemented method described above. The system may be further configured as Is described herein.

BRIEF DESCRIPTION OF THE DRAWINGS

Other objects and advantages of the invention will become apparent upon reading the following detailed description and upon reference to the accompanying drawings in which.

Figure 1:
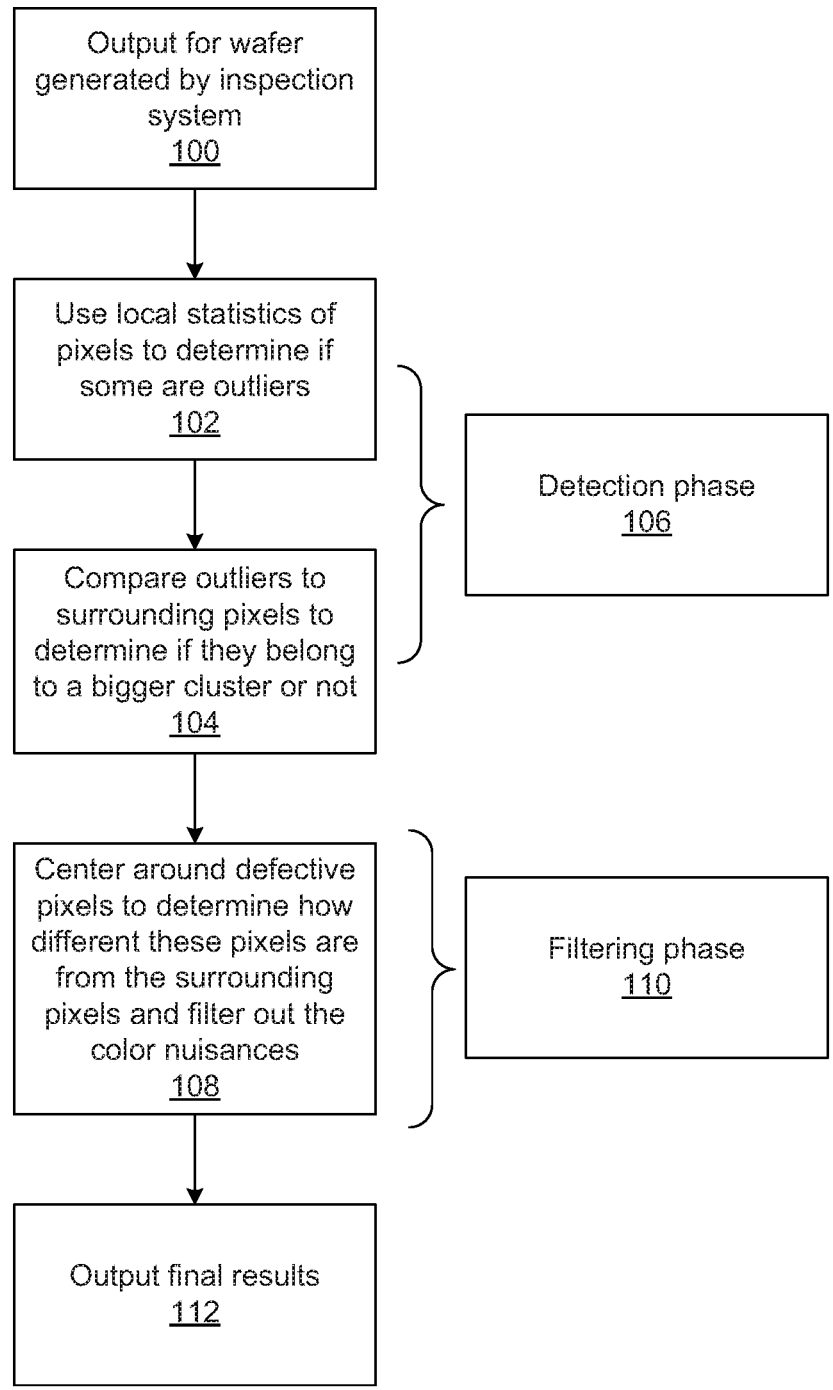
FIG. 1 is a flow chart illustrating one embodiment of a computer-implemented method for detecting defects on a wafer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements, One embodiment relates to a computer-implemented method for detecting defects on a wafer. As is described in detail further herein, the embodiments use adaptive local thresholds and color filtering to detect defects on wafers.

The method includes determining local statistics of pixels in output for a wafer generated using an inspection system. The computer-implemented method may include acquiring the output using the inspection system. For example, acquiring the Output may include scanning light over the wafer and generating output responsive to light from the wafer detected by the inspection system during the scanning. In this manner, acquiring the output may include scanning the wafer. However, acquiring the output does not necessarily include scanning the wafer. For example, acquiring the output may include acquiring the output from a storage medium in which the output has been stored (e.g., by the inspection system). Acquiring the output from the storage medium may be performed in any suitable manner, and the storage medium from which the output is acquired may include any of the storage media described herein.

The local statistics of the pixels may be determined in any suitable manner using an algorithm or method configured depending on the statistics being determined). The local statistics of the pixels may also be any suitable statistics such as sum, sum of squares, mean, median, range, variance, standard deviation from variance, standard deviation from sum of squares, probability functions, and the like. The local statistics of the pixels that are used in the method may vary depending on the wafer and its characteristics. For example, as described further herein, the local statistics of the pixels are used to detect outliers in the output. Therefore, based on the characteristics of the Is wafer, any local statistics that can be used to differentiate outliers from non-outliers can be used in the embodiments described herein.

In one embodiment, the local statistics include one or more local statistics of difference values for the pixels. In one such embodiment, the difference values are determined by subtracting a characteristic of the pixels in the output for a reference structure on the wafer from the characteristic of their corresponding pixels in the output for a test structure on the wafer. In another such embodiment, the difference values are determined based on intensity of the pixels. For example, the characteristic of the pixels that is used for determining the difference values may include intensity or gray level intensity or any other suitable characteristic. The test structure and the reference structure may include any two dies on the wafer such as two dies that are adjacent to each other on the wafer. However, any other reference and test structures known in the art may be used in the embodiments described herein (e.g., cells, fields, etc.), In some embodiments, the local statistics are determined across fewer than all of the pixels in a frame image of the output. For example, a frame image of the output may include a number of pixels that vary depending on the configuration of the wafer inspection system and the wafer inspection recipe. In general, a frame image may be a portion of the output that can be processed together as a whole for defect detection or any other image processing function. Therefore, clearly, the local statistics are preferably determined across a substantially small portion of the wafer. In some instances, the neighborhood of pixels used to determine the local statistics for any one pixel may include the pixels immediately adjacent to and surrounding the one pixel. However, the neighborhood of pixels used to determine the local statistics may also include more pixels than just those immediately adjacent to the pixel being examined. For example, the pixels used to determine the local statistics may be a 5 pixel by 5 pixel array centered on the pixel under test.

In another embodiment, the local statistics of the pixels include a local two-dimensional (2D) scatter plot. The 2D scatter plot may be determined for two or more characteristics of the difference values and/or other values for the pixels in the output. For example, some type of median values for the pixels in the output may be plotted along the y-axis, and the difference values for the pixels in the output may be plotted along the x-axis. The 2D scatter plot may be generated using any suitable method and/or algorithm.

The method also includes determining which of the pixels are outliers based on the local statistics. For example, as shown in FIG. 1, output for a wafer generated by an inspection system may be input to the method as shown in step 100. The output that is inputted into the method may include any of the output described herein such as test and reference frame images. The output may be used to determine local statistics of the pixels as described herein and, as shown in step 102, the method may include using the local statistics of the pixels to determine if some of the pixels are outliers. In this manner, the embodiments described herein examine pixels of the same neighborhood as the pixel under test to identify if the pixel under test is outstanding with respect to the local statistics of their local surrounding.

In another embodiment, determining which of the pixels are the outliers includes determining a local threshold for one pixel based on its local statistics, comparing a value of the local statistics for the one pixel to the local threshold, and determining if the one pixel is an outlier if the value of the local statistics for the one pixel is greater than the local threshold. For example, there may be substantial color variation in the difference frames (the result of subtracting reference frames from test frames) for a wafer, e.g., on edges of frames. Therefore, if defect detection is performed using a threshold that is substantially close to the noise floor of the output for the wafer (i.e., in a hot scan), the number of detected events using the difference frames will be substantially high. Many of these detected events will be nuisances due to the color variation and other noise sources in the output. To reduce the number of nuisances, the threshold may be raised substantially to be much higher than the noise floor of the output (i.e., in a cold scan). Although the number of nuisances that are detected can be substantially reduced by applying a much higher threshold to the difference frames, the higher threshold may not Is eliminate all instances of the nuisances. The much higher threshold can also result in defects of interest (DOIs) going undetected. However, if a local adaptive threshold is determined for and applied to any given pixel in any given inspection frame, the threshold at any pixel or inspection frame can be relatively close to the noise floor while also eliminating most nuisance defects and detecting most DOIs. The local threshold can be determined based on the local statistics in the same manner that a threshold is currently determined (e.g., based on a noise estimate for a wafer).

In one embodiment, determining which of the pixels are outliers is performed based on the local statistics in combination with a local 2D scatter plot generated for the pixels. For example, the embodiments described herein can look at a 2D scatter plot and other statistics of the immediate surroundings of pixels being examined and measure how different the examined pixels are from the surrounding pixels. In this manner, the embodiments described herein can combine local statistics information with 2D scatter plots) to identify if the examined pixels are optical real or color variation from similar substrates. The 2D scatter plot(s) may be determined as described further herein.

The method also includes comparing the outliers to the pixels surrounding the outliers to identify the outliers that do not belong to a cluster of outliers as defect candidates. For example, as shown in step 104 of the method shown in FIG. 1, the method may include comparing the outliers to surrounding pixels to determine if they belong to a bigger cluster or not. If the outliers belong to a bigger cluster, then the outliers can be determined to be part of a local color variation on the wafer. In this manner, in one embodiment, comparing the outliers to the pixels surrounding the outliers also identifies the outliers that belong to a cluster of outliers as local color nuisances. In contrast, if the outliers do not belong to a bigger cluster, then the outliers can be determined to be defect candidates since they do not appear to be part of a local color variation. The outliers may be determined to be part of a bigger cluster if they are adjacent to other outliers in the output. In addition, or alternatively, the outliers may be determined to be part of a bigger cluster if they have one or more characteristics that are the same as or substantially the same as the one or more characteristics of adjacent outliers.

In some embodiments, determining the local statistics, determining which of the pixels are the outliers, and comparing the outliers to the surrounding pixels are performed in a detecting phase of inspection of the wafer. For example, as shown in FIG. 1, steps 102 and 104 may be part of detection phase 106 (i.e., the inspection step). In this manner, the steps in the detection phase may take as input the output (e.g., images, image data, etc.) generated by the inspection system and produce output that includes information for potential defect candidates on the wafer.

The method also includes determining a value for a difference in color between the pixels of the defect candidates and the pixels surrounding the defect candidates. The difference in color may be determined in any suitable manner (e.g., using any suitable algorithm and/or method). The difference in color may be determined as any suitable value that can be used to quantify color differences.

In one embodiment, the method includes eliminating one or more of the defect candidates prior to determining the value for the difference in the color based on one or more characteristics of the pixels of the defect candidates. In one such embodiment, the one or more characteristics of the pixels include polarity. For example, the defect candidates that are detected using the local adaptive threshold described above can be separated based on polarity (i.e., one group of defects having a bright or mixed polarity and another group of defects having a dark polarity). Local color differences can then be determined for only a subset of the defect candidates (e.g., the defects in the dark polarity group). The local color filter can then be applied to only one group of defects. For example, the local color filter can be applied to the dark polarity group and not the bright and mixed polarity group. The local color filter can be applied to only one group of defects in the same manner described further herein.

The method further includes identifying the defect candidates that have a value for the difference in the color that is greater than or equal to a predetermined value as nuisance defects and identifying the defect candidates that have a value for the difference in the color that is less than the predetermined value as real defects. For example, as shown in step 108, the method may include centering around defective pixels to determine how different these pixels are from the surrounding pixels and filtering out color nuisances. In this manner, the embodiments described herein examine pixels of same neighborhood as the defect candidates to identify if the defect candidates are outstanding with respect to the color(s) of their local surroundings. The predetermined value for the color difference can be determined in the same manner as the local adaptive threshold described above. In this manner, the predetermined value may he a local adaptive threshold for color. However, since the difference in the color is determined for each defect candidate as a local color difference, the same predetermined value may be used for each defect candidate detected on the entire wafer. In other words, the threshold applied to the local color difference may be a global threshold.

By using a local 2D scatter plot and other statistics as described herein, the embodiments can reduce color nuisance during inspection and post-processing. "Color nuisances" is generally defined herein as differences in color in images of a wafer that are not due to defects on the wafer, but are due to process variations on the wafer. Therefore, the wafer itself may not have local color differences, but the images of the wafer produced by an inspection system may have local color differences due to changing conditions on the wafer due to local process variations that are not defects. Therefore, detecting such color differences as defects is disadvantageous.

When local color is present in images of a wafer, usually the color difference not only shows up in the defective pixels, it also shows up in similar substrates in the surroundings. The local adaptive threshold and color filter embodiments described herein utilize this additional information and provide an effective way of identifying if the defective pixels are optical real or color variation. The embodiments described herein can substantially eliminate color nuisance signatures in defect detection results. As a result, the embodiments described herein can achieve higher sensitivity, and particularly higher DOI sensitivity, with the presence of local process variation (local color) than other methods and systems for eliminating color variation nuisance from wafer inspection results.

In one embodiment, determining the value for the difference in the color, identifying the defect candidates as the nuisance defects, and identifying the defect candidates as the real defects are performed in a filtering phase of inspection of the wafer. For example, as shown in FIG. 1, step 108 described further above may be performed during filtering phase 110 of the method. The filtering phase may include the post-processing step of filtering and any other suitable post-processing steps known in the art. As further shown in FIG. 1, the method may include outputting the final results in step 112 after the filtering phase has been performed.

In one such embodiment, the filtering phase does not include identifying the nuisance defects and the real defects based on energy parameters of the defect candidates. In another such embodiment, the filtering phase does not include identifying the nuisance defects and the real defects based on size of the defect candidates. For example, as described above, some attempts to reduce the nuisance rate for wafers having color variation have been made using defect size or energy parameters to eliminate nuisance defects from inspection results. However, since the embodiments described herein do not use defect size or energy parameters to filter nuisance defects from the inspection results, the embodiments described herein will not suffer from the disadvantages of the currently used methods described above. In particular, since the embodiments described herein filter defects based on color variation rather than defect size, the embodiments described herein will be more stable than filtering based on defect size since, unlike defect size, color variation is not also used for defect detection. In addition, unlike using the energy attribute for filtering nuisance defects, the local color filters described herein will work for both bigger, more spread out color variation as well as strongly concentrated color variations whether those strong concentrations in color differences are due to material variations or process variations. Furthermore, the embodiments described herein can be used to decrease the nuisance rate effectively without dropping DOIs and particularly smaller, more important DOIs. However, at, the tittering phase, the energy parameter and size may not he excluded from the filtering. For example, a user can select to use the energy parameter and size in combination with color variation as described herein, which will provide better differentiation.

In one embodiment, the wafer has one or more local process variations that result in one or more local differences in color. In another embodiment, the wafer has one or more process variations that span an area on the wafer that is smaller than an area of the wafer corresponding to a frame image in the output. For example, color variation in wafer images could have strong differences yet it may not come from abnormality of the substrate. In addition, color variation usually clusters around the same type of substrate but may not have an outstanding presence in a bigger area such as an inspection frame. The embodiments described herein improve DOI sensitivity with the presence of local color variation. In particular, often DOIs can be de-tuned (become undetectable) due to the overwhelming presence of color variation. As such, DOI sensitivity can be lost due to overwhelming color variation. In addition, DOIs can be lost in both detection and post-filtering steps. With the local adaptive threshold and color filter described herein, the nuisance rate during inspection and post processing can be greatly reduced when color variation is the nuisance source. In addition, unlike 2D outlier detection, the embodiments described herein can discriminate the difference between actual defects and color nuisances when color variation is localized to some substrates but not others. Furthermore, the embodiments described herein do not lose the local spatial content of individual pixels in the output for the wafer.

In an additional embodiment, the wafer has one or more global process variations that result in one or more global differences in color from other wafers of the same type at the same point in a fabrication process as the wafer. For example, the embodiments described herein can efficiently detect defects on wafers and tolerate global color variation.

Determining the local statistics, determining which of the pixels are the outliers, comparing the outliers, determining the value for the difference in the color, identifying the defect candidates as the nuisance defects, and identifying the defect candidates as the real defects are performed by a computer system, which may be configured as described further herein.

All of the methods described herein may include storing results of one or more steps of the method embodiments in a computer-readable storage medium. The results may include any of the results described herein and may be stored in any manner known in the art. The storage medium may include any storage medium described herein or any, other suitable storage medium known in the art. After the results have been stored, the results can be accessed in the storage medium and used by any of the method or system embodiments described herein, formatted for display to a user, used by another software module, method, or system, etc.

Figure 2:
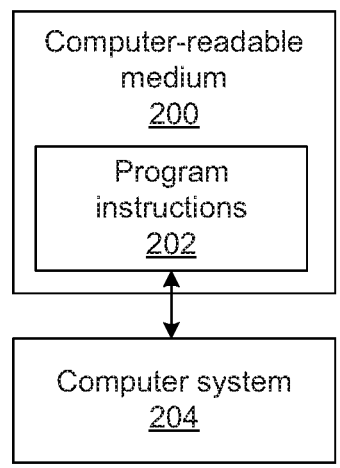
FIG. 2 is a block diagram illustrating one embodiment of a non-transitory computer-readable medium storing program instructions executable on a computer system for performing one or more of the computer-implemented method embodiments described herein.

Another embodiment relates to a non-transitory computer-readable medium storing program instructions executable on a computer system for performing a computer-implemented method for detecting defects on a wafer. One such embodiment is shown in FIG. 2. For example, as shown in FIG. 2, non-transitory computer-readable medium 200 includes program instructions 202 executable on computer system 204 for performing the computer-implemented method for detecting defects on a wafer described above. The computer-implemented method for which the program instructions are executable may include any other step(s) of any other method(s) described herein.

Program instructions 202 implementing methods such as those described herein may be stored on non-transitory computer-readable medium 200. The computer-readable medium may be a storage medium such as a magnetic or optical disk, a magnetic tape or any other suitable computer-readable medium known in the art.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, Java Beans, Microsoft Foundation Classes ("MFC"), or other technologies or methodologies, as desired.

Computer system 204 may take various forms, including a personal computer system, mainframe computer system, workstation, system computer, image computer, programmable image computer, parallel processor, or any other device known in the art. In general, the term "computer system" may be broadly defined to encompass any device having one or more processors, which executes instructions from a memory medium.

Figure 3:
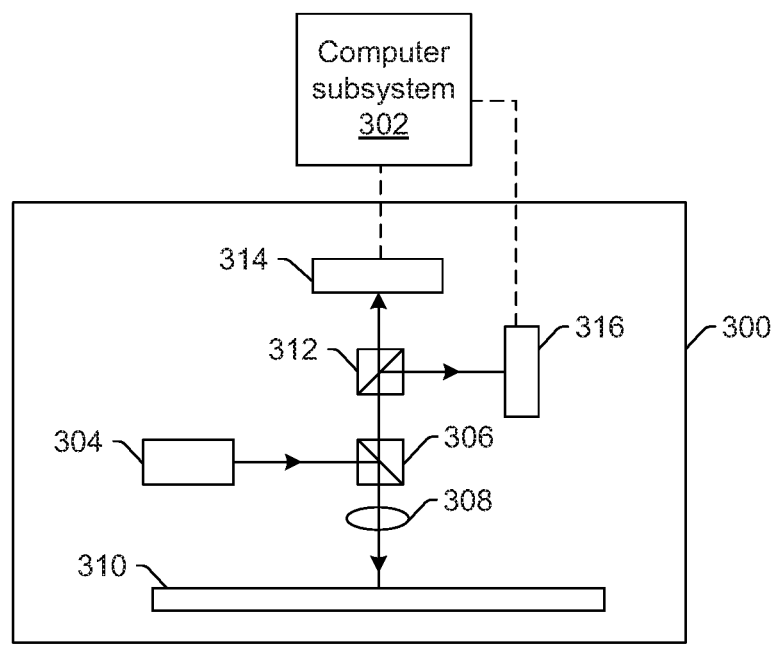
FIG. 3 is a schematic diagram illustrating a side view of one embodiment of a system configured to detect defects on a wafer.

An additional embodiment relates to a system configured to detect defects on a wafer. One embodiment of such a system is shown in FIG. 3. As shown in FIG. 3, the system includes optical subsystem 300 and computer subsystem 302. The optical subsystem is configured to direct light to a wafer and detect light from the wafer to thereby generate output for the wafer. For example, as shown in FIG. 3, the optical subsystem includes light source 304, which may include any suitable light source known in the art.

Light from the light source may be directed to beam splitter 306, which play be configured to direct the light from the light source though lens 308 to wafer 310. The light source may be coupled to any other suitable elements (not shown) such as one or more condensing lenses, collimating lenses, relay lenses, objective lenses, apertures, spectral filters, polarizing components and the like. As shown in FIG. 3, the light may be directed to the wafer at a normal angle of incidence. However, the light may be directed to the wafer at any suitable angle of incidence including near normal and oblique incidence. In addition, the light or multiple light beams may be directed to the wafer at more than one angle of incidence sequentially or simultaneously. The optical subsystem may be configured to scan the light over the wafer in any suitable manner.

Light reflected from wafer 310 may be collected and detected by multiple channels of the optical subsystem during scanning For example, light specularly reflected from wafer 310 may be collected by lens 308. Lens 308 may include a refractive optical element as shown in FIG. 3. In addition, lens 308 may include one or more refractive optical elements and/or one or more reflective optical elements. Light collected by lens 308 may be directed through beam splitter 306 to beam splitter 312, which may be configured to separate the light into two different paths, one of Which is directed to detector 314 and another of which is directed to detector 316. The beam splitters shown in FIG. 3 may include any suitable beam splitters known in the art. The detectors shown in FIG. 3 may include any suitable detectors known in the art such as charge coupled devices (CCDs) or another type of imaging detectors. Detectors 314 and 316 are configured to generate output that is responsive to the specularly reflected light. Therefore, each of the detectors form one channel of the optical subsystem, Since the optical subsystem shown in FIG. 3 is configured to detect light specularly reflected from the wafer, the optical subsystem is configured as a bright field (BF) optical subsystem. Such an optical subsystem may, however, also be configured for other types of wafer inspection. For example, the optical subsystem shown in FIG. 3 may also include one or more other channels (not shown). The other channel(s) may include any of the optical components described herein such as a lens and a detector, configured as a scattered light channel. The lens and the detector may be further configured as described herein. In this manner, the optical subsystem may also he configured for dark field (DF) inspection. In addition, the optical subsystem shown in FIG. 3 may be replaced with an e-beam inspection subsystem (e.g., for scanning electron microscope (SEM) inspection).

Computer subsystem 302 is configured to acquire the output generated by the optical subsystem. For example, output generated by the detector(s) during scanning may be provided to computer subsystem 302. In particular, the computer subsystem may be coupled to each of the detectors (e.g., by one or more transmission media shown by the dashed lines in FIG. 3, which may include any suitable transmission media known in the art) such that the computer subsystem may receive the output generated by the detector(s).

The computer subsystem is configured for performing the steps of the computer-implemented method described further herein. The computer subsystem may be configured to perform any other step(s) of any method embodiment(s) described herein. The computer subsystem, the optical subsystem, and the system may he further configured as described herein.

It is noted that FIG. 3 is provided herein to generally illustrate one configuration of an optical subsystem that may be included in the system embodiments described herein. Obviously, the optical subsystem configuration described herein may be altered to optimize the performance of the optical subsystem as is normally performed when designing a commercial inspection system. In addition, the systems described herein may be implemented using an existing inspection system (e.g., by adding functionality described herein to an existing inspection system) such as the 29xx/28xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Further modifications and alternative embodiments of various aspects of the invention will be apparent to those skilled in the art in view of this description. For example, methods and systems for detecting defects on a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may he substituted for those illustrated and described herein, parts and processes may be reversed, and certain features of the invention may be utilized independently, all as would be apparent to one skilled in the art after having the benefit of this description of the invention. Changes may he made in the elements described herein without departing from the spirit and scope of the invention as described in the following claims.

What is claimed is:

1. A system configured to detect defects on a wafer, comprising:
   an optical subsystem configured to direct light to a wafer and detect light from the wafer to thereby generate output for the wafer; and
   a computer subsystem configured for:
      determining local statistics of pixels in the output for the wafer, wherein the output for which the local statistics are determined comprises output generated with multiple angles of incidence;
      determining which of the pixels are outliers based on the local statistics;
      comparing the outliers to the pixels surrounding the outliers to identify the outliers that do not belong to a cluster of outliers as defect candidates and to further identify the outliers that belong to a cluster of outliers as local color nuisances;

determining a value for a difference in color between the pixels of the defect candidates and the pixels surrounding the defect candidates;

identifying the defect candidates that have a value for the difference in the color that is greater than or equal to a predetermined value as nuisance defects; and identifying the defect candidates that have a value for the difference in the color that is less than the predetermined value as real defects.

2. The system of claim 1, wherein the output for which the local statistics are determined further comprises output generated with multiple channels of the optical subsystem.

3. The system of claim 1, wherein the output for which the local statistics are determined further comprises output responsive to specularly reflected light from the wafer and output responsive to scattered light from the wafer.

4. The system of claim 1, wherein the local statistics comprise one or more local statistics of difference values for the pixels.

5. The system of claim 1, wherein the local statistics comprise one or more local statistics of difference values for the pixels, and wherein the difference values are determined by subtracting a characteristic of the pixels in the output for a reference structure on the wafer from the characteristic of their corresponding pixels in the output for a test structure on the wafer.

6. The system of claim 1, wherein the local statistics comprise one or more local statistics of difference values for the pixels, and wherein the difference values are determined based on intensity of the pixels.

7. The system of claim 1, wherein the local statistics are determined across fewer than all of the pixels in a frame image of the output.

8. The system of claim 1, wherein determining which of the pixels are the outliers comprises determining a local threshold for one pixel based on its local statistics, comparing a value of the local statistics for the one pixel to the local threshold, and determining if the one pixel is an outlier if the value of the local statistics for the one pixel is greater than the local threshold.

9. The system of claim 1, wherein the local statistics of the pixels comprise a local two-dimensional scatter plot.

10. The system of claim 1, wherein determining which of the pixels are outliers is performed based on the local statistics in combination with a local two-dimensional scatter plot generated for the pixels.

11. The system of claim 1, wherein determining the local statistics, determining which of the pixels are the outliers, and comparing the outliers are performed in a detecting phase of inspection of the wafer.

12. The system of claim 1, wherein determining the value for the difference in the color, identifying the defect candidates as the nuisance defects, and identifying the defect candidates as the real detects are performed in a filtering phase of inspection of the wafer.

13. The system of claim 12, wherein the filtering phase does not comprise identifying the nuisance defects and the real defects based on energy parameters of the defect candidates.

14. The system of claim 12, wherein the filtering phase does not comprise identifying the nuisance defects and the real defects based on size of the defect candidates.

15. The system of claim 1, wherein the computer subsystem is further configured for eliminating one or more of the defect candidates prior to determining the value for the difference in the color based on one or more characteristics of the pixels of the defect candidates.

16. The system claim 15, wherein the one or more characteristics of the pixels comprise polarity.

17. The system of claim 1, wherein the wafer has one or more local process variations that result in one or more local differences in color.

18. The system of claim 1, wherein the wafer has one or more local process variations that span an area on the wafer that is smaller than an area of the wafer corresponding to a frame image in the output.

19. The system of claim 1, wherein the wafer has one or more global process variations that result in one or more global differences in color from other wafers of the same type at the same point in a fabrication process as the wafer.

20. A computer-implemented method for detecting defects on a wafer, comprising:

determining local statistics of pixels in output for a wafer generated using an inspection system, wherein the output for which the local statistics are determined comprises output generated with multiple angles of incidence;

determining which of the pixels are outliers based on the local statistics;

comparing the outliers to the pixels surrounding the outliers to identify the outliers that do not belong to a cluster of outliers as defect candidates and to further identify the outliers that belong to a cluster of outliers as local color nuisances;

determining a value for a difference in color between the pixels of the defect candidates and the pixels surrounding the defect candidates;

identifying the defect candidates that have a value for the difference in the color that is greater than or equal to a predetermined value as nuisance defects; and identifying the defect candidates that have a value for the difference in the color that is less than the predetermined value as real defects, wherein determining the local statistics, determining which of the pixels are the outliers, comparing the outliers, determining the value for the difference in the color, identifying the defect candidates as the nuisance defects, and identifying the defect candidates as the real defects are performed by a computer system.

21. A non-transitory computer-readable medium, storing program instructions executable on a computer system for performing a computer-implemented method for detecting defects on a wafer, wherein the computer-implemented method comprises:

determining local statistics of pixels in output for a wafer generated using an inspection system, wherein the output for which the local statistics are determined comprises output generated with multiple angles of incidence;

determining which of the pixels are outliers based on the local statistics;

comparing the outliers to the pixels surrounding the outliers to identify the outliers that do not belong to a cluster of outliers as defect candidates and to further identify the outliers that belong to a cluster of outliers as local color nuisances;

determining a value for a difference in color between the pixels of the detect candidates and the pixels surrounding the defect candidates;

identifying the defect candidates that have a value for the difference in the color that is greater than or equal to a predetermined value as nuisance defects; and identifying the defect candidates that have a value for the difference in the color that is less than the predetermined value as real defects.

22. A system configured to detect defects on a wafer, comprising:
an optical subsystem configured to direct light to a wafer and detect light from the wafer to thereby generate output for the wafer; and
a computer subsystem configured for:
determining local statistics of pixels in the output for the water, wherein the output for which the local statistics are determined comprises output generated with multiple channels of the optical subsystem;
determining which of the pixels are outliers based on the local statistics;
comparing the outliers to the pixels surrounding the outliers to identify the outliers that do not belong to a cluster of outliers as detect candidates and to further identify the outliers that belong to a cluster of outliers as local color nuisances;
determining a value for a difference in color between the pixels of the defect candidates and the pixels surrounding the defect candidates;
identifying the defect candidates that have a value for the difference in the color that is greater than or equal to a predetermined value as nuisance defects; and
identifying the defect candidates that have a value for the difference in the color that is less than the predetermined value as real defects.

23. A system configured to detect defects on a wafer, comprising:
an optical subsystem configured to direct light to a wafer and detect light from the wafer to thereby generate output for the wafer; and
a computer subsystem configured for:
determining local statistics of pixels in the output for the wafer, wherein the output for which the local statistics are determined comprises output responsive to specularly reflected light from the wafer and output responsive to scattered light from the wafer;
determining which of the pixels are outliers based on the local statistics;
comparing the outliers to the pixels surrounding the outliers to identify the outliers that do not belong to a cluster of outliers as defect candidates and to further identify the outliers that belong to a cluster of outliers as local color nuisances;
determining a value for a difference in color between the pixels of the defect candidates and the pixels surrounding the defect candidates;
identifying the defect candidates that have a value for the difference in the color that is greater than or equal to a predetermined value as nuisance defects; and
identifying the defect candidates that have a value for the difference in the color that is less than the predetermined value as real defects.

* * * * *